United States Patent [19]

Kobel

[11] Patent Number: 5,266,986
[45] Date of Patent: Nov. 30, 1993

[54] SYSTEM AND METHOD FOR PROVIDING ENLARGED PRINTS OF COLOR TRANSPARENCIES AND NEGATIVES

[76] Inventor: John O. Kobel, 254 Queen, Montreal, Quebec, Canada, H3C-2N8

[21] Appl. No.: 6,244

[22] Filed: Jan. 19, 1993

Related U.S. Application Data

[63] Continuation of Ser. No. 592,505, Oct. 3, 1990, abandoned, which is a continuation-in-part of Ser. No. 371,515, Jun. 26, 1989, abandoned.

[51] Int. Cl.⁵ .................... G03B 27/32; G03B 27/52
[52] U.S. Cl. .......................... 355/32; 355/35; 355/77; 355/88; 430/7
[58] Field of Search ............ 355/32, 35, 88, 77; 430/4, 7

[56] References Cited

U.S. PATENT DOCUMENTS

| | | | |
|---|---|---|---|
| 3,622,690 | 11/1971 | Stephens et al. | 178/5.2 R |
| 4,241,153 | 12/1980 | Rovnjev | 430/4 |
| 4,295,872 | 10/1981 | Luers | 65/30.11 |
| 4,325,631 | 4/1982 | McCullion, Jr. | 355/77 |
| 4,610,536 | 9/1986 | Smyth et al. | 355/38 |
| 4,647,182 | 3/1987 | Pierce | 355/32 X |
| 4,681,427 | 7/1987 | Plummer | 355/32 |
| 4,788,116 | 11/1988 | Hochberg | 355/32 X |
| 5,051,341 | 9/1991 | Muenter et al. | 355/35 X |

Primary Examiner—Richard A. Wintercorn
Attorney, Agent, or Firm—Fishman, Dionne & Cantor

[57] ABSTRACT

A system for producing a full color enlarged reproduction of a color transparency or negative on a photographic paper. The system makes use of a continuous tone scanner having a given contrast range to produce enlarged color separation negatives of the original transparency or negative on a continuous tone photographic film. Prior to producing these enlarged color separation negatives, the continuous tone scanner is adjusted to condensate its contrast range to accommodate the photographic paper. The color separation negatives that are so obtained may be used, after development, for producing the requested full color enlarged reproduction on the photographic paper, using a three color printing system to do so. the color print that is so obtained has an excellent definition and color reproduction.

9 Claims, 1 Drawing Sheet

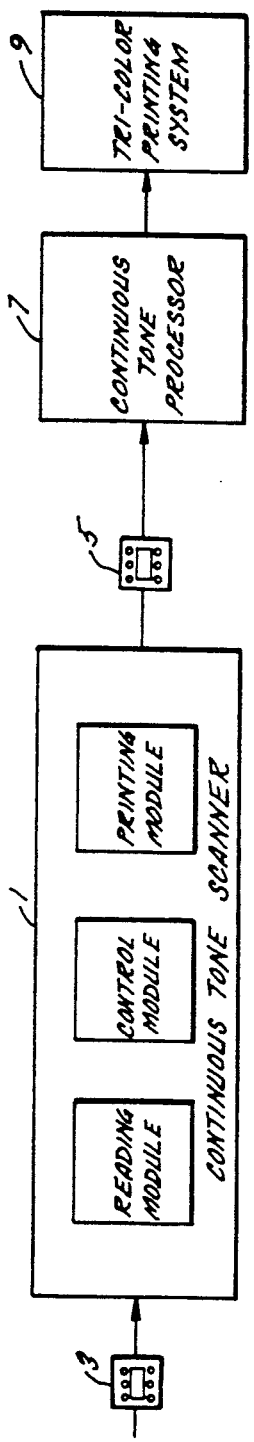
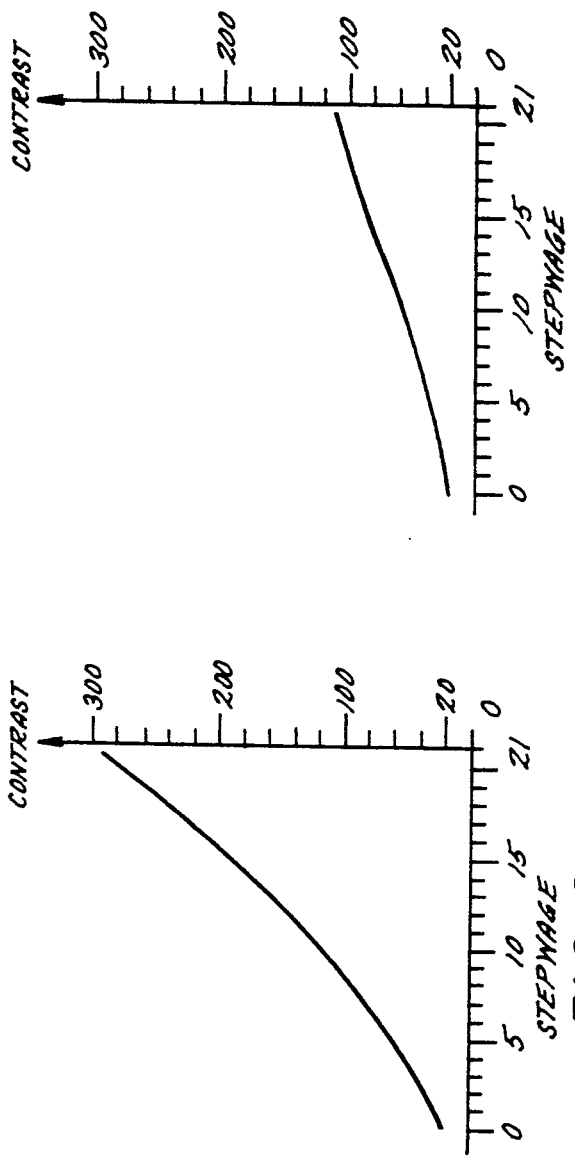

SYSTEM AND METHOD FOR PROVIDING ENLARGED PRINTS OF COLOR TRANSPARENCIES AND NEGATIVES

This application is a continuation of application Ser. No. 592,505, filed Oct. 3, 1990, now abandoned, which is a continuation-in-part of application Ser. No. 371,515, filed Jun. 26, 1989, also abandoned.

BACKGROUND OF THE INVENTION a) Field of the Invention

The present invention relates to a system for producing full color enlargements of color transparencies or negatives on photographic papers.

The invention also relates to a method for producing full color enlargements of color transparencies or negatives on photographic papers which method makes use of the inventive system.

b) Brief Description of the Prior Art

In the photographic art, a conventional method that is commonly used for producing a full color enlargement of a color transparency or negative on a photographic paper, consists in projecting the color transparency or negative onto the photographic paper in such a manner as directly to obtain the requested "blow up". Another conventional method consists in producing an enlarged negative from the transparency or negative on a photographic film and then using the enlarged negative to print the requested enlargement on a photographic paper, by contact or any other technique well known in this particular field. A further conventional method consists in producing color separation negatives of the transparency or negative on a photographic film, blowing up these color separation negatives, and then using them in a tri-color printing system known per se, to produce the requested enlargement onto a photographic paper.

In all of these conventional methods used to produce photographic enlargements, it is compulsory that the contrast of the transparency or negative to be enlarged and, of course, of any enlarged negative or separation negative produced along the method, be adjusted to match with the characteristics of the photographic paper being used, which are commonly "adapted" for contrasts ranging from 20 to 110.

In the following specification, the word "contrast" is defined as the difference between the maximum and minimum densities. A definition of the term "density" as used in photography is given in the pamphlet "PRACTICAL DENSITOMETRY" printed by Eastman Kodak Company of Rochester, N.Y. At page 23 of this brochure, it is indicated that density normally ranges from 0 to 3.0. However, for ease of manipulation of the density numbers, these numbers are multiplied by 100 (0 to 300). This is the convention which is adapted in the present specification.

In another technical field, namely the graphic arts, a conventional method that is commonly used for printing full color enlargements of a color transparency or negative, consists in producing enlarged color separation negatives of the transparency or negative with a laser scanner and then using these separation negatives to produce printing plates that can subsequently be used in a rotographic or offset printing machine (see U.S. Pat. Nos. 4,325,631 and 4,647,182).

In this particular case, it is essential that a maximum of contrast be obtained when the color separation negatives are produced, since these negatives have to be highly contrasted (up to 290) in order to subsequently produce the printing plates or screened substrates that are used in the printing machine.

All the laser scanners that are presently used in this particular industry, are designed to produce "screened negatives" consisting of myriads of solid dots on a transparent base. As a matter of fact, dots have become the conventional method of producing separation negatives for use in printing industry.

Another type of scanner, known as "continuous tone scanner", has also been used in the past for the same purpose, namely to produce separation negatives for use in the printing industry. Such a continuous tone scanner makes use of a special photographic film hereinafter called "continuous tone photographic film", and produces negatives which are made up of hundreds of thousands of ultra-fine lines extending parallel to each other all over the film, in a number of 100 to 300 per centimeter. An example of continuous tone laser scanner including a color correction computer, is disclosed by way of example in U.S. Pat. No. 3,622,690.

Once again, the continuous tone scanner to be efficient in the printing industry, must produce highly contrasted separation negatives. Thus, such a scanner also works with contrast up to 290.

This kind of continuous tone scanner is now considered as obsolete because it produces negatives that have to be screened in order to be used in a printing machine. Therefore, it is no more in use.

SUMMARY OF THE INVENTION

The present invention is based on the discovery that full color enlarged reproductions of very high quality and improved sharpness on standard photographic papers, can be made from color transparencies or negatives provided that:

a continuous tone scanner is used to produce on a continuous tone photographic film enlarged color separation negatives of the transparencies or negatives to be reproduced;

prior to producing the enlarged color separation negatives, the continuous tone scanner is adjusted to condense its contrast range to accomodate the photographic paper on which the reproduction is to be made; and after development, separation negatives that are so produced, are used in a tri-color printing system to produce the desired reproductions.

More particularly the present invention proposes a system for producing a full color enlarged reproduction of a color transparency or of a negative on a photographic paper, said system comprising:

means for producing enlarged color separation negatives of the transparency or negative, on a photographic film;

means for developing the separation negatives; and tri-color printing means for producing the requested full color enlarged reproduction on the photographic paper from the developped separation negatives; characterized in that:

said means for producing the enlarged color separation negatives consist of a continuous tone scanner having a given constrast range;

the continuous tone scanner is adjusted to condense its contrast range to accomodate the photographic paper, and the photographic film on which said enlarged color separation negatives are produced, is a continuous tone photographic film;

whereby color prints of better definition and color reproduction are obtained.

The invention also proposes a method for producing full color enlarged reproduction of a color transparency or of a negative on a photographic paper, the method comprising:

producing enlarged color separation negatives of the transparency or negative on a photographic film;

developing the separation negatives; and producing the requested full color enlarged reproduction on the photographic paper from said separation negatives, using tri-color printing means to do so; characterized in that:

use is made of a continuous tone scanner having given contrast range to produce the enlarged color separation negatives;

the enlarged color separation negatives are produced on a continuous tone photographic film; and prior to producing the enlarged color separation negatives, the continuous tone scanner is adjusted to condense its contrast range to accommodate the photographic paper.

As was explained hereinabove, color tone scanners are already known in the art. In the early days of color photography, continuous tone scanners have been used to produce negatives from a 4×5 or 8×10 camera, which negatives were contact printed on photographic paper. This was before the invention of color negatives.

Presently, continuous tone scanners are considered as obsolete in the photographic art, because of the operating contrast of such scanners which is normally in the order of 200 and up, that is well above the maximum contrast accomodable by the conventional photographic papers. Such high contrasts make the scanners useful only to produce highly contrasted negatives capable of being screened to produce printing plates for rotographic presses.

To the Applicant's knowledge, nobody so far has had the "idea" of using continuous tone scanners in combination with tri-color printing systems to produce color prints of negatives of transparencies on a standard photographic paper.

More particularly, no-one has thought of adjusting the contrast range of a continuous tone scanner to a value in the range of 20 to 110, preferably 80, that is well under the conventional operating values of such scanner, to make the separation negatives produced with the scanner "compatible" with any standard photographic paper. Moreover, no one could have expected the very suprising results of such a combination, namely the production of color prints having much better definition and color reproduction than usual.

As was also explained hereinabove, the use of a laser scanner making use of color separation to reproduce a photograph, document or painting is known in the art (see for example U.S. Pat. Nos. 4,610,536 and 4,681,427 both to POLAROID CORPORATION). The use of a scanner producing three or four color separations for use in an offset printing machine, is also known in the art (see U.S. Pat. No. 4,647,182). All of these patents however call for scanners which are not continuous tone scanners and produce highly contrasted negatives. There is no indication or suggestion in these patents to adjust the contrast of the scanner down to value where the negatives could accomodate a standard photographic paper.

BRIEF DESCRIPTION OF THE DRAWINGS

The invention will be better understood on reading the following description, together with the accompanying drawings, in which:

FIG. 1 is a schematic block diagram of a system according to the invention; and

FIG. 2a and 2b are characteristic curves showing the contrast range versus the stepwage of a continuous tone scanner as used in the system according to the invention, before and after adjustment accomodate photographic paper.

GENERAL DESCRIPTION OF THE INVENTION

The system according to the invention as FIG. 1 comprises a continuous tone scanner 1 which can comprise any arrangement for scanning a negative or transparency 3 and producing a color separation negative 5 of this negative or transparing on a color tone photographic film. For example, an arrangement as taught in U.S. Pat. No. 3,622,690 can be used for this purpose. However, in a preferred embodiment, use is made of a HELL 299 or CHROMAGRAPH 299 continuous tone scanner as discussed in an operating manual of the same title prepared by Dr.-Ing. Rudolf Hell GmbH. Although both the HELL 299 and the arrangement as taught in U.S. Pat. No. 3,622,690 teach the use of a laser scanner, the invention can also be carried out with an arrangement which uses, for example, a glow lamp scanner instead. In all cases, the color tone scanner can be basically disclosed as containing a reading module in which the negative or transparency 3 is scanned, a control module for processing digital signals received from the reading module and a printing module in which the color separation negatives are produced.

In the scanner 1, a color negative or transparency 3 of the picture to be enlarged and printed in color is scanned by one light beam to produce the desired film recording density to modulate a second light beam which exposes the negative 5. This is described in U.S. Pat. No. 3,622,690 patent and is also described at pages 11 et seq. of the CHROMAGRAPH 299 operating manual.

The scanner 1 is adjusted for color correction to thereby adjust the contrast as described, for example, at pages 21 et seq. of the CHROMAGRAPH 299 manual. Enlarged color separation negatives for cyan, magenta, yellow and black are thereby produced on a color tone photographic film, i.e. on a film specially produced for use with color tone scanners, such a special film being sold by way of example by AGFA.

In accordance with the invention, the scanner is adjusted before the separation negatives are produced so that its original characteristic curve shown in FIG. 2a be as illustrated in FIG. 2b. Instructions for effecting such adjustments on the HELL 299 are discussed in the CHROMAGRAPH 299 operating manual at pages 45 et seq. Using the same adjustment elements, various colors can either be enhanced or decreased.

The color separation negatives are then developed in a continuous tone processor 7, like sold under the trade mark PAKOTONE by Pako Corporation.

In accordance with a preferred embodiment of the invention, the process of developing the color separation negatives in the processor 7 is sped up. That is, the negatives are developed for 1¼ minutes instead of 2 minutes suggested by the producer of the continuous tone film used in the process, thereby reducing high light density and thus too high contrast that are to be avoided to obtain high quality prints on a standard photographic paper like those widely available in the market.

After development, the separation negatives, are contact printed on a color photographic paper using a tri-color printing system like the one sold under the trade mark PROOFMASTER by the Carlson Company. The result of the contact printing step as above is the requested enlarged color print.

As aforesaid the basic difference between the present system and method and the system and method as previously used, is that, in accordance with the invention, the negatives are produced on a continuous tone scanner which has been adjusted to accommodate the contrast range of photographic paper.

The resulting prints obtained on photographic paper are of very high definition and sharpness, as compared to prints obtained through other systems.

The system and method according to the invention are thus applicable in advertising, graphic arts, art reproduction and other areas where the sharpness of the print is of utmost importance. The system and method according to the invention can be used as a base for hand retouching as the produced prints can in thus be enlarged over four times on a conventional dot generating scanner.

The system and method according to the invention are also applicable to medical photography as photographs taken through microscopes often lack sharpness. For the same reason, it is applicable to space photography as well. It can also be used in the movie industry to sharpen frames of movie film providing clear prints up to 2,500 percent of the original size, and it can also be used in law enforcement to sharpen indistinct images of criminal acts and suspects. The method may also be used to sharpen out of focus negatives.

Although particular embodiments have been described, this was for the purpose of illustrating, but not limiting, the invention. Various modifications, which will come readily to the mind of one skilled in the art, are within the scope of the invention as defined in the appended claims. By way of example, it has been disclosed hereinabove that the system according to the invention makes use of a continuous tone scanner wherein the negative to be reproduced is first scanned or "read" to produce digital signals that are further processed to produce the requested separation negatives. Accordingly, one may easily understand that images scanned by a telescope or any other scanning means and expressed into digital signals could be processed "directly", by "skipping out" the scanning module of the continuous tone scanner and feeding the signals directly to the control module of the continuous tone scanner. Such a variant should of course be considered as encompassed by the appended claims.

The embodiments of the invention in which an exclusive property or privilege is claimed are defined as follows:

1. A system for producing a full color enlarged reproduction of a color transparency or negative on a photographic paper, said system comprising:
   means for producing enlarged color separation negatives of said transparency or negative, on a photographic film;
   means for developing said separation negatives; and
   tri-color printing means for producing the requested full color enlarged reproduction on said photographic paper from said developped separation negatives; wherein:
   said means for producing said enlarged color separation negatives consist of a continuous tone scanner having a given contrast range;
   said continuous tone scanner is adjusted to condense its contrast range to accomodate said photographic paper, and
   said photographic film on which said enlarged color separation negatives are produced, is a continuous tone photographic film;
   whereby color prints of better definition and color reproduction are obtained.

2. A system as defined in claim 1, said means for developing in said separation negatives produced on said continuous tone photographic film is adjusted so that said developing takes place at a sped up rate in order to reduce high light density and thus better balance the contrast of said separation negatives.

3. A system as defined in claim 2, wherein said continuous tone scanner is a laser scanner or a glow lamp scanner.

4. A system as defined in claim 1, wherein said contrast range is adjusted to between 20 and 110.

5. A system as defined in claim 1, wherein said contrast is adjusted to 80.

6. A method for producing full color enlarged reproduction of a color transparency or negative on a photographic paper, said method comprising:
   producing enlarged color separation negatives of said transparency or negative on a photographic film;
   developing said separation negatives; and
   producing the requested full color enlarged reproduction on said photographic paper from said separation negatives, using tri-color printing means to do so; wherein:
   use is made of a continuous tone scanner having a given contrast range to produce said enlarged color separation negatives;
   said enlarged color separation negatives are produced on a continuous tone photographic film; and
   prior to producing said enlarged color separation negatives, said continuous tone scanner is adjusted to condense its contrast range to accommodate said photographic paper.

7. A method as defined in claim 6, wherein said developing step at a speed up rate in order to reduce high light density and thus better balance the contrast of said separation negatives.

8. A method as defined in claim 6, wherein the contrast range of said continuous tone scanner is adjusted to 20 and 110.

9. A method as defined in claim 6, wherein the contrast of said continuous tone scanner is adjusted to 80.

* * * * *